United States Patent [19]

McGrath et al.

[11] 3,751,724

[45] Aug. 7, 1973

[54] ENCAPSULATED ELECTRICAL COMPONENT

[76] Inventors: N. Christian McGrath, 168 Hopkinton Rd., Concord, N.H. 03301; Roger M. Nash, Eaton Pky., Meredith, N.H. 03253

[22] Filed: Apr. 28, 1972

[21] Appl. No.: 248,501

[52] U.S. Cl. ..... 317/234 R, 317/234 E, 317/234 G, 317/234 N, 29/586

[51] Int. Cl. .......................... H01l 3/00, H01l 5/00

[58] Field of Search ...................... 317/234, 3, 314, 317/4, 4.1, 5, 5.4; 174/DIG. 3; 29/586

[56] References Cited

UNITED STATES PATENTS

| | | | |
|---|---|---|---|
| 2,836,878 | 6/1958 | Shepard | 317/234 F |
| 3,564,109 | 2/1971 | Ruechardt | 317/234 A |

FOREIGN PATENTS OR APPLICATIONS

| | | | |
|---|---|---|---|
| 183,436 | 4/1963 | Sweden | 317/234 J |

OTHER PUBLICATIONS

IBM Technical Disclosure Bulletin, by using; Vol. 9, No. 3 Aug. 1966 page 224.

*Primary Examiner*—John W. Huckert
*Assistant Examiner*—Andrew J. James
*Attorney*—Vincent H. Sweeney

[57] ABSTRACT

The lead frame of an electrical component has a generally circular and substantially continuous portion thereon that is indexed under a dispenser to receive a pre-metered drop of an encapsulant. The encapsulant viscosity and surface tension are such that it flows around and under this circular portion forming a protective mass therearound that is retained in place prior to being cured. The retained droplet thereby forms the final package shape and outline for the electrical component.

7 Claims, 3 Drawing Figures

ENCAPSULATED ELECTRICAL COMPONENT

BACKGROUND OF THE INVENTION

This invention relates to encapsulating electrical components, and more particularly to electrical components having a free form encapsulant thereon and a method of making same.

The electronic industry has long had a requirement for versatile, low-cost and easily handled components. Many of these components require an outer protective coating or encapsulant, and the art has made many attempts to provide such protective coats over the years. However, these attempts, while being somewhat successful, have been accompanied by problems of restrictions of component or lead frame design, the necessary use of expensive molding or casting equipment, and poor reproducibility of results. The above is true especially in attempting to package miniature transistors.

Prior art attempts include a transfer mold-silicone encapsulant system. For this system, a die is used in conjunction with a heavy and rather expensive press. Lead frame design was restricted to one that would fit into the die cavities. De-flashing and punch-out problems, together with increased costs make this system impractical. Another method utilizes liquid casting resins with expendable flexible molds. This method requires a low initial capital investment, but this is overcome by the need to continually replace the molds. Resin dispensing difficulties also accompany this method — mold filling was at times incomplete, air sometimes became entrapped in the resin, and the resin itself was affected by shrinkage. Further, lead frame design and the design of a lead frame fixture for loading the mold introduced additional difficulties and costs. Still another prior art means of encapsulating electrical components is by dipping the components into an encapsulant. However, this technique is not very reproducible, and the lead design of the unit must be one that is compatible with a dipping procedure.

Accordingly, it is an object of the present invention to provide an encapsulate for electrical components that is low-cost and that can be easily reproduced.

It is another object of this invention to provide a method of encapsulating electrical components that does not unreasonably restrict the lead frame design of the component.

Still another object of the instant invention is to provide a technique of encapsulating that does not require subsequent punch-out or de-flashing steps.

SUMMARY OF THE INVENTION

A pre-metered amount of a thermosetting polymer having a particular viscosity and surface tension is dispensed onto the center of a lead frame assembly having a generally circular and substantially continuous portion with a ceramic or silicon chip thereon. The droplet of encapsulant flows onto and around the chip to form a solidified mass in which the chip is protected. The viscosity and surface tension of the encapsulant is such that when the encapsulant is applied to the component it clings thereto maintaining its shape indefinitely prior to gelling and curing. The lead frame is positioned so that the greatest mass of encapsulant is retained over the chip. In this manner the underside of the component then becomes somewhat flattened advantageously permitting orientation of the device. The encapsulant is then cured by heat to form the outline and shape of the final package. This free-form encapsulation permits the use of a variety of encapsulants and formulations while placing no consequential restrictions on the lead design.

DESCRIPTION OF THE PREFERRED EMBODIMENT

Figure 1:
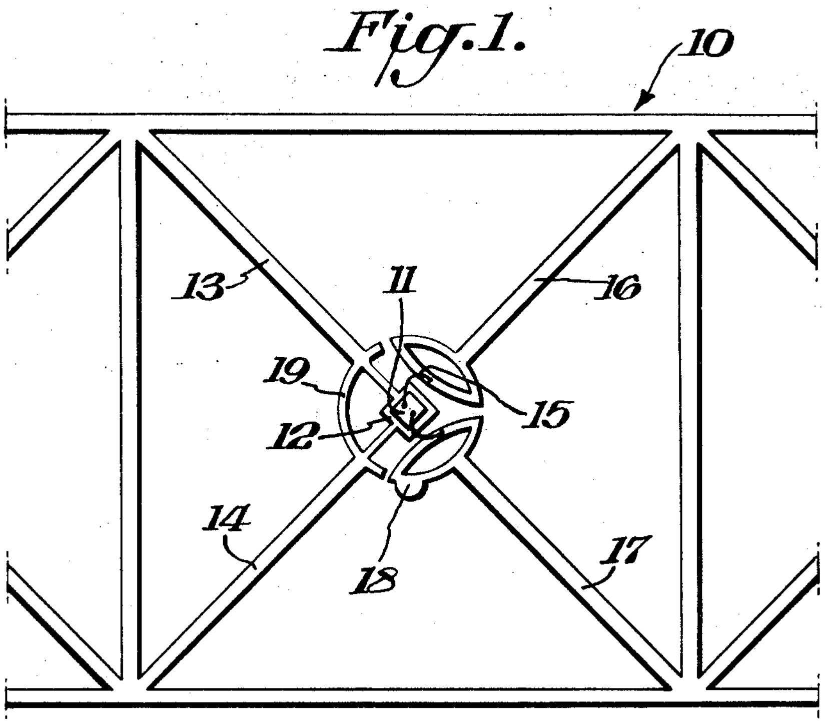
FIG. 1 is a plan view of a transistor lead frame assembly having a semiconductor chip thereon prior to encapsulation.

In FIG. 1, an example of lead frame assembly 10 for a miniature transistor is presented. A semiconductor chip 11 is mounted and bonded to the enlarged base plate 12 that extends out from collector leads 13 and 14. The semiconductor chip 11 is electrically connected to a base lead 17 and an emitter lead 16 by gold wires 15. The wires 15 can be bonded to the chip 11 and to leads 16 and 17 by any convenient means known to those skilled in the art, such as thermo-compression bonding.

The design of the leads 13, 14, 16, 17 is such that a substantially continuous circle is formed by the semicircular extension 19 of leads 13 and 14 and the terminals of leads 16 and 17. The lead design is not continuous, so as to render it non-conductive and to permit the flow there-through of the encapsulating material, but should be substantially continuous so as to prevent the encapsulant from falling away from the assembly upon being dispensed.

Lead 17 is conveniently designed so as to include an orientation tab 18 which permits the ultimate user to identify the "back" and "front" of the transistor.

Figure 2:
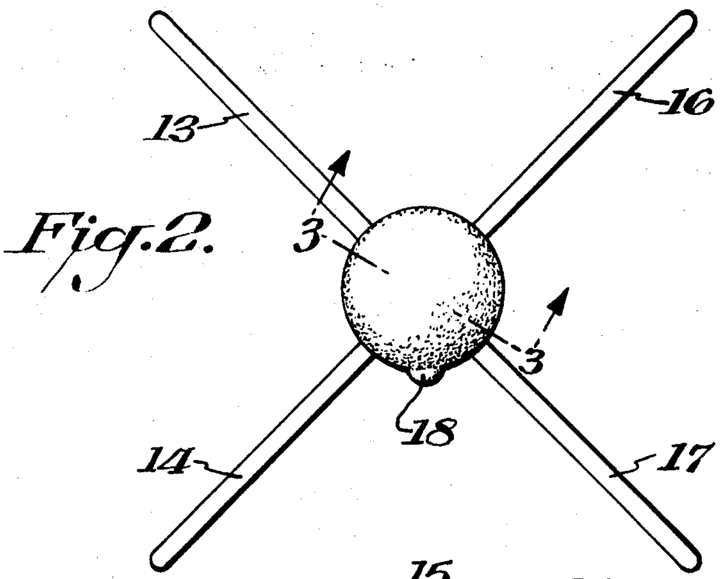
FIG. 2 is a plan view of the unit of FIG. 1 after encapsulation and with the lead frame support removed.

FIG. 2 shows the transistor of FIG. 1 with the encapsulant 21 thereon. The orientation tab 18 remains quite prominent even upon being covered by the encapsulant 21. The supporting lead frame 10 has been removed in this figure, leaving the encapsulated transistor with leads 13, 14, 16 and 17 extending out therefrom.

Figure 3:
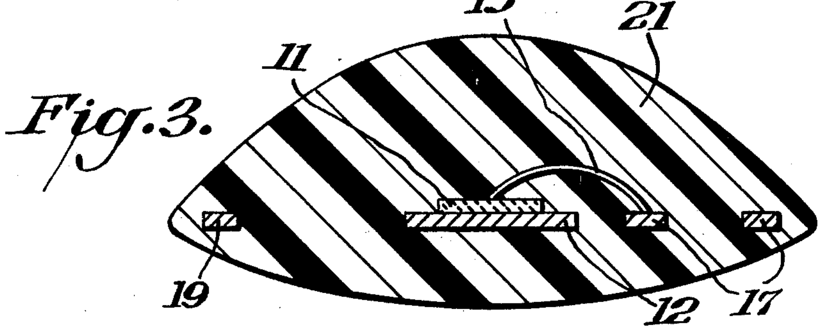
FIG. 3 shows a sectional view of FIG. 2 along line 3 — 3.

FIG. 3 is a cross section of the encapsulated unit of FIG. 2 along line 3—3, and shows the base plate 12 having the semiconductor chip 11 bonded thereto and having a connecting wire 15 running from the chip 11 to lead 17. The outermost portion of lead 17 is also shown as well as the semi-circular extension 19 of the collector leads. The encapsulating material 21 completely envelopes the electrical component and has a majority thereof atop the semiconductor chip 11 while the "bottom" of the package retains a substantially flattened appearance — this feature advantageously provides further orientation for the ultimate user.

The surface tension and viscosity of the encapsulating material are the primary controlling features of this invention. These variables should be such that when a pre-metered amount of the encapsulant is dispensed onto the component it clings to the ring-shaped body formed by the lead terminations and the component but flows through and around same so that the greatest mass of encapsulant is over the chip causing the other side thereof to become substantially flattened. The encapsulant is formulated so as to maintina its shape indefinitely prior to gel. The encapsulated unit is then gelled and cured by heat. The amount of encapsulant dispensed should be sufficient to completely cover the ring-shaped configuration and the component situated thereon.

In a typical example of this invention, a transistor has a lead frame assembly of Kovar, and a substantially continuous circular or ring-shaped portion thereof measures approximately 0.090 inch in diameter and is approximatly 0.005 inch thick with a total of about 43 percent of its metallized area removed. Three of the four leads on the transistor are electrically isolated from each other by a gap — the four leads extending radially outward from the ring-shaped body at approximately 90° angles from each other to an outer supportive frame used for assembly operatons. The two collector leads are electrically connected to each other at a terminal point that is square shaped. A semiconductor chip is bonded to the body within the collector leads at this square shaped point and is electrically connected to the emitter and base leads as by wire bonding techniques. The ring-shaped portion of the assembly is indexed under a dispensing needle whose diameter is about the same as that of the ring-shaped portion. Approximately 0.01cc.± 10 percent of a thermosetting polymer is dispensed thereon and allowed to flow over and around the chip and ring-shaped body so as to completely envelope same. The thermosetting polymer used herein is an epoxy resin having an internal viscosity of approximately 60,000 centipoises measured at 25° C consistent with a surface tension of about 60 dynes per centimeter measured at the same temperature. This consistency permits the dispensed encapsulant to retain its shape indefinitely. The above units are subsequently gelled and cured to a rather rigid state at 125° and 200° C respectively.

While an epoxy resin is advantageously used above, it should be noted that any thermosetting polymer can be successfully used providing that the viscosity and surface tension of the polymer can be adjusted to retain its shape prior to gel upon being dispensed onto a component. The encapsulants can be made without using thixotropic agents; however, since these agents act as buffers to prevent gross viscosity and surface tension shifts due to temperature change and varying dispensing conditions, such agents should advantageously be used herein. Inert fillers in the formulation also affect the viscosity and surface tension. The key to correct filler content is getting a totally uniform dispersion with complete wetting of all filler particles. Once this is accomplished, the flow of the encapsulant becomes predictable. These fillers may advantageously include boron nitride, aluminum oxide and silica, and may be present in the encapsulant in amounts up to about 50 percent by volume. The thixotropic agents that can advantageously be used herein include powdered Teflon mica, lithium aluminum silicate and 5 to 7 micron silica.

In the preferred embodiment of this invention, a preliminary protective varnish coat may advantageously be applied over the chip prior to the dispensing of the encapsulant thereon to protect against contamination of the chip or breakage of the wire connections made thereto.

The preferred embodiment herein is a transistor, having four leads and a particular circular lead design. However, this invention is also applicable to two-terminal components such as capacitors, resistors, diodes and the like, and other multi-leaded devices such as integrated circuits. This can be achieved by modifying the art work for the micro-milling, altering the diameter of the encapsulant dispensing nozzle, changing the formulation of the encapsulant and/or the volume of the metered drop to meet the new package requirements. The portion of the device or component to be encapsulated may be circular or ring-shaped, semi-elliptical, hexagonal or of any generally circular design. It must however be substantially continuous, though non-conductive, and have sufficient openings therein that permit the flow therethrough of portions of the encapsulant.

Among the advantages of this invention are that it permits the packaging of a wide variety of components having different lead designs without the necessity of changing dies or molds and without the use of expensive presses and costly, time consuming stamping procedures. The process can readily be automated and produces greater reproducibility than prior art processes with an accompanying substantial cost reduction.

The above-described specific embodiments of the invention have been set forth for the purposes of illustration. It will be apparent to those skilled in the art that various modifications may be made in the composition and design of the encapsulated component without departing from the principles of this invention as pointed out and disclosed herein. For that reason, it is not intended that the invention should be limited other than by the scope of the appended claims.

What is claimed is:

1. An encapsulated electrical component comprising at least two conductive leads spaced divergent from one another, said leads having extensions at the inner ends thereof forming a substantially ring-shaped body having minor non-conducting discontinuities, an electrical device within the confines of said ring-shaped member and electrically connected to said leads, and a polymeric encapsulating material completely enveloping said device and said ring-shaped member and passing through said discontinuities.

2. The encapsulated component of claim 1 wherein said encapsulating material is an epoxy resin.

3. The encapsulated component of claim 1 wherein said component has four leads radially extending out therefrom; and said substantially ring-shaped body has a semiconductor chip thereon in electrical connection with at least two of said leads.

4. The encapsulated component of claim 3 wherein said encapsulating material is an epoxy resin.

5. The encapsulated component of claim 4 wherein said ring-shaped body has an orientation tab extending outwardly therefrom that is covered with said encapsulating material, and wherein a majority of said encapsulating material is atop said semiconductor chip while the other side of said ring-shaped body is substantially flattened.

6. The encapsulated component of claim 5 wherein said semiconductor chip has a protective coat of varnish thereon prior to encapsulation thereof; and wherein said four leads radially extend out from said ring-shaped body at approximately 90° angles from each other.

7. An encapsulated electrical component comprising a transistor having four leads radially extending out from a ring-shaped body at approximately 90° angles from each other, said ring-shaped body has a semiconductor chip thereon in electrical connection with two of said leads, and said ring-shaped body is substantially continuous and electrically non-conductive but having discontinuities within said body; an orientation tab extending out from said ring-shaped body; a protective coat of varnish on said semiconductor chip; an epoxy resin completely enveloping said ring-shaped body, said orientation tab and said semiconductor chip, and having a majority of said epoxy resin atop said semiconductor chip while the other side of said ring-shaped body is substantially flattened.

* * * * *

UNITED STATES PATENT OFFICE
CERTIFICATE OF CORRECTION

Patent No. 3,751,724 Dated August 7, 1973

Inventor(s) N.Christian McGrath, Roger M. Nash

It is certified that error appears in the above-identified patent and that said Letters Patent are hereby corrected as shown below:

In the heading on the title page under the inventors' names should appear

-- (73) Assignee: Sprague Electric Company

North Adams, Massachusetts --

Signed and sealed this 20th day of November 1973.

(SEAL)
Attest:

EDWARD M.FLETCHER,JR.
Attesting Officer

RENE D. TEGTMEYER
Acting Commissioner of Patents